US007774325B2

(12) United States Patent
Coates et al.

(10) Patent No.: US 7,774,325 B2
(45) Date of Patent: Aug. 10, 2010

(54) DISTRIBUTED NETWORK ATTACHED STORAGE SYSTEM

(75) Inventors: Joshua L. Coates, Orinda, CA (US); Patrick E. Bozeman, Berkeley, CA (US); Alfred Gary Landrum, San Francisco, CA (US); Peter D. Mattis, San Francisco, CA (US); Naveen Nalam, San Francisco, CA (US); Drew S. Roselli, Berkeley, CA (US)

(73) Assignee: Intel Corporation, Santa Clara, CA (US)

( * ) Notice: Subject to any disclaimer, the term of this patent is extended or adjusted under 35 U.S.C. 154(b) by 491 days.

(21) Appl. No.: 10/368,026

(22) Filed: Feb. 13, 2003

(65) Prior Publication Data

US 2004/0088297 A1     May 6, 2004

Related U.S. Application Data

(60) Provisional application No. 60/419,778, filed on Oct. 17, 2002.

(51) Int. Cl.
*G06F 17/30* (2006.01)
(52) U.S. Cl. .................. 707/704; 707/764; 718/105
(58) Field of Classification Search .................. 707/10, 707/200, 205, 202, 204, 100, 8, 102, 687, 707/704, 764; 714/763, 769, 770, 746; 718/105; 711/111, 112, 114; 713/153, 154; 709/225, 709/226
See application file for complete search history.

(56) References Cited

U.S. PATENT DOCUMENTS

| | | | |
|---|---|---|---|
| 5,497,422 | A | 3/1996 | Tysen et al. |
| 5,506,984 | A | 4/1996 | Miller |
| 5,550,986 | A | 8/1996 | DuLac |
| 5,692,155 | A | 11/1997 | Iskiyan et al. |
| 5,708,832 | A | 1/1998 | Inniss et al. |
| 5,757,920 | A | 5/1998 | Misra et al. |

(Continued)

FOREIGN PATENT DOCUMENTS

CN          1726454 A     1/2006

(Continued)

OTHER PUBLICATIONS

Burns et al., Safe Caching in a Distributed File System for Network Attached Storage, Parallel and Distributed Processing Symposium, 2000, IPDPS 2000. Proceedings, 14th International, May 1-5, 2000, pp. 155-162, Digital Object Identifier 10.1109/IPDPS.2000.845977.*

(Continued)

*Primary Examiner*—Greta L Robinson
(74) *Attorney, Agent, or Firm*—Christopher K. Gagne

(57) ABSTRACT

A distributed data storage system stores a single image file system across a plurality of physical storage volumes. The physical storage may be direct attached storage, or may be coupled through a storage area network ("SAN"). One or more clients communicate with a plurality of storage nodes through a network. A client of the distributed data storage system transmits a request over the network for a file identified in the file system. A load-balancing switch selects one of the storage nodes to process the request. The storage node accesses at least one of the physical volumes and transmits a response for the storage operation to the client.

18 Claims, 9 Drawing Sheets

U.S. PATENT DOCUMENTS

| | | | |
|---|---|---|---|
| 5,764,972 | A | 6/1998 | Crouse et al. |
| 5,796,952 | A | 8/1998 | Davis et al. |
| 5,805,699 | A | 9/1998 | Akiyama et al. |
| 5,870,537 | A | 2/1999 | Kern et al. |
| 5,923,846 | A | 7/1999 | Gage et al. |
| 5,933,834 | A | 8/1999 | Aichelen |
| 5,937,406 | A | 8/1999 | Balabine et al. |
| 5,978,577 | A | 11/1999 | Rierden et al. |
| 5,991,542 | A * | 11/1999 | Han et al. ............ 717/167 |
| 6,061,692 | A | 5/2000 | Thomas et al. |
| 6,067,545 | A * | 5/2000 | Wolff .................. 707/10 |
| 6,081,883 | A | 6/2000 | Popelka et al. |
| 6,101,508 | A * | 8/2000 | Wolff .................. 709/223 |
| 6,108,155 | A | 8/2000 | Tanaka et al. |
| 6,128,627 | A | 10/2000 | Mattis et al. |
| 6,141,759 | A | 10/2000 | Braddy |
| 6,148,349 | A | 11/2000 | Chow et al. |
| 6,170,013 | B1 | 1/2001 | Murata |
| 6,173,374 | B1 | 1/2001 | Heil et al. |
| 6,236,999 | B1 | 5/2001 | Jacobs et al. |
| 6,256,673 | B1 | 7/2001 | Gayman |
| 6,263,402 | B1 | 7/2001 | Ronstrom et al. |
| 6,272,584 | B1 | 8/2001 | Stancil |
| 6,304,980 | B1 | 10/2001 | Beardsley et al. |
| 6,314,465 | B1 | 11/2001 | Paul et al. |
| 6,324,581 | B1 | 11/2001 | Xu et al. |
| 6,327,614 | B1 | 12/2001 | Asano et al. |
| 6,351,775 | B1 | 2/2002 | Yu |
| 6,356,929 | B1 | 3/2002 | Gall et al. |
| 6,360,306 | B1 | 3/2002 | Bergsten |
| 6,389,420 | B1 * | 5/2002 | Vahalia et al. ............ 707/8 |
| 6,389,462 | B1 | 5/2002 | Cohen et al. |
| 6,393,466 | B1 | 5/2002 | Hickman et al. |
| 6,405,201 | B1 | 6/2002 | Nazari |
| 6,438,125 | B1 | 8/2002 | Brothers |
| 6,442,548 | B1 | 8/2002 | Balabine et al. |
| 6,487,561 | B1 * | 11/2002 | Ofek et al. ............ 707/204 |
| 6,507,883 | B1 * | 1/2003 | Bello et al. ............ 711/4 |
| 6,553,376 | B1 | 4/2003 | Lewis et al. |
| 6,553,389 | B1 | 4/2003 | Golding et al. |
| 6,574,641 | B1 * | 6/2003 | Dawson et al. ............ 707/204 |
| 6,611,869 | B1 | 8/2003 | Eschelbeck et al. |
| 6,622,247 | B1 | 9/2003 | Isaak |
| 6,651,123 | B1 | 11/2003 | Hutchison et al. |
| 6,654,772 | B1 * | 11/2003 | Crow et al. ............ 707/205 |
| 6,704,838 | B2 | 3/2004 | Anderson |
| 6,718,347 | B1 | 4/2004 | Wilson |
| 6,782,389 | B1 * | 8/2004 | Chrin et al. ............ 707/10 |
| 6,895,418 | B1 * | 5/2005 | Crow et al. ............ 707/205 |
| 6,912,548 | B1 * | 6/2005 | Black ............ 707/200 |
| 6,931,450 | B2 * | 8/2005 | Howard et al. ............ 709/229 |
| 6,948,062 | B1 | 9/2005 | Clapper |
| 7,007,047 | B2 | 2/2006 | Zelenka et al. |
| 7,010,528 | B2 * | 3/2006 | Curran et al. ............ 707/8 |
| 7,089,293 | B2 * | 8/2006 | Grosner et al. ............ 709/217 |
| 7,099,900 | B1 * | 8/2006 | Bromley et al. ............ 707/204 |
| 7,173,929 | B1 | 2/2007 | Testardi |
| 7,194,538 | B1 | 3/2007 | Rabe et al. |
| 7,266,556 | B1 | 9/2007 | Coates |
| 7,272,661 | B2 | 9/2007 | Sato |
| 7,275,103 | B1 * | 9/2007 | Thrasher et al. ............ 709/224 |
| 7,281,044 | B2 | 10/2007 | Kagami et al. |
| 7,313,614 | B2 * | 12/2007 | Considine et al. ............ 709/223 |
| 7,487,152 | B1 | 2/2009 | Uceda-Sosa et al. |
| 7,496,646 | B2 | 2/2009 | Casper et al. |
| 7,506,040 | B1 | 3/2009 | Rabe et al. |
| 2001/0047400 | A1 * | 11/2001 | Coates et al. ............ 709/219 |
| 2002/0010757 | A1 | 1/2002 | Granik et al. |
| 2002/0054114 | A1 | 5/2002 | Shuping et al. |
| 2002/0078244 | A1 | 6/2002 | Howard |
| 2002/0083120 | A1 | 6/2002 | Soltis |
| 2002/0133491 | A1 * | 9/2002 | Sim et al. ............ 707/10 |
| 2002/0133539 | A1 | 9/2002 | Monday |
| 2003/0065896 | A1 | 4/2003 | Krueger |
| 2003/0105865 | A1 * | 6/2003 | McCanne et al. ............ 709/225 |
| 2003/0149770 | A1 * | 8/2003 | Delaire et al. ............ 709/226 |
| 2003/0182285 | A1 | 9/2003 | Kuwata et al. |
| 2003/0229645 | A1 * | 12/2003 | Mogi et al. ............ 707/102 |
| 2004/0019781 | A1 * | 1/2004 | Chari et al. ............ 713/153 |
| 2004/0039756 | A1 * | 2/2004 | Bromley ............ 707/200 |
| 2004/0078465 | A1 * | 4/2004 | Coates et al. ............ 709/226 |
| 2004/0078466 | A1 * | 4/2004 | Coates et al. ............ 709/226 |
| 2004/0088297 | A1 | 5/2004 | Coates |
| 2007/0094378 | A1 | 4/2007 | Baldwin et al. |
| 2008/0320134 | A1 | 12/2008 | Edsall et al. |

FOREIGN PATENT DOCUMENTS

| | | |
|---|---|---|
| EP | 0646858 A1 | 8/1994 |
| WO | WO 99/45491 | 9/1999 |
| WO | WO 01/67707 A2 | 9/2001 |
| WO | 2004/036408 A2 | 4/2004 |
| WO | 2004036408 A3 | 4/2004 |

OTHER PUBLICATIONS

PCT Search Report, PCT/US03/33175, Filing date, Oct. 17, 2003, 6 Pages.

Kline: Distributed File Systems for Storage Area Networks; Advanced Digital Info Corp; 11 pages.

Apache-SSL: Certificates, Configuration and More Information.Systems and Technology ; University of Waterloo; Sep. 15, 1998; 4 pages.

Schroeder: Implementing Multi-Protocol Authentication/Security Systems; Grid (GSI) Secure Socket Layer (X.509 Certificates), Kerberos, DCE, and Custom Systems for Secure Distributed Data Access; Jul. 19, 1999; 4 pages.

BEA WebLogic SSL; Server 4.5; 20 pages.

Certificate to LDAP Mapping in Netscape Servers, Rev 1.2; Aug. 28, 1997; Structured Arts Technical Notes.

Microsoft Press, Computer Dictionary 3rd Edition, 1997, p. 337.

Response to Non-Final Office Action received for U.S. Appl. No. 10/367,436, filed Oct. 31, 2006, 8 pages.

Response to Final Office Action received for U.S. Appl. No. 10/367,436, filed May 1, 2007, 9 pages.

Response to Final Office Action received for U.S. Appl. No. 10/367,436, filed Aug. 1, 2007, 13 pages.

Response to Non-Final Office Action received for U.S. Appl. No. 10/367,436, filed Apr. 4, 2008, 14 pages.

Response to Final Office Action received for U.S. Appl. No. 10/367,436, filed Oct. 27, 2008, 17 pages.

Response to Non-Final Office Action received for U.S. Appl. No. 10/367,436, filed Feb. 10, 2009, 20 pages.

Final Office Action received for U.S. Appl. No. 10/367,436, mailed on May 19, 2009, 21 pages.

Final Office Action received for U.S. Appl. No. 10/367,436, mailed on Feb. 1, 2007, 21 pages.

Non-Final Office Action received for U.S. Appl. No. 10/367,436, mailed on Aug. 21, 2007, 19 pages.

Response to Final Office Action received for U.S. Appl. No. 10/367,436, filed Jul. 15, 2009, 17 pages.

Non-Final Office Action received for U.S. Appl. No. 10/367,541, mailed on Oct. 11, 2006, 15 pages.

Non-Final Office Action received for U.S. Appl. No. 09/753,332, mailed on Oct. 19, 2006, 22 pages.

Response to Non-Final Office Action received for U.S. Appl. No. 10/367,436, filed Jan. 22, 2008, 13 pages.

Non-Final Office Action received for U.S. Appl. No. 10/367,436, mailed on Aug. 14, 2009, 29 pages.

Office Action received for U.S. Appl. No. 09/695,499, mailed on Dec. 11, 2006, 16 pages.

Office Action received for U.S. Appl. No. 09/733,314, mailed on Nov. 15, 2006, 14 pages.

Office Action received for U.S. Appl. No. 10/367,436, mailed on Jul. 26, 2006, 13 pages.

Office Action received for U.S. Appl. No. 10/367,436, mailed on Jul. 31, 2008, 18 pages.

Office Action received for U.S. Appl. No. 10/367,436, mailed on Dec. 16, 2008, 17 pages.

Response to Office Action received for U.S. Appl. No. 10/367,436, filed Oct. 1, 2009, 18 pages.

Notice of Allowance received for U.S. Appl. No. 10/367,436, mailed on Feb. 16, 2010.

Office Action received for Chinese Applicaton No. 200380106239.7, mailed on Jun. 30, 2006, 8 Pages of Office Action and 18 Pages of English Translation.

Response to Office Action received for Chinese Application No. 200380106239.7, filed on Nov. 10, 2006, 5 Pages.

Mogul, J. "Internet Subnets", Network Working Group, Computer Science Department, Stanford University, Oct. 1984, pp. 1-22.

* cited by examiner

DISTRIBUTED NETWORK ATTACHED STORAGE SYSTEM

CROSS-REFERENCES TO RELATED APPLICATIONS

This application claims the benefit of U.S. Provisional Patent Application No. 60/419,778, filed Oct. 17, 2002, entitled "A Distributed Storage System."

BACKGROUND OF THE INVENTION

1. Field of the Invention

The present invention is directed toward the field of data storage, and more particularly toward a distributed network data storage system.

2. Art Background

There is an increasing demand for systems that store large amounts of data. Many companies struggle to provide scalable, cost-effective storage solutions for large amounts of data stored in files (e.g., terabytes of data). One type of prior art system used to store data for computers is known as network attached storage ("NAS"). In a NAS configuration, a computer, such as a server, is coupled to physical storage, such as one or more hard disk drives. The NAS server is accessible over a network. In order to access the storage, the client computer submits requests to the server to store and retrieve data.

Conventional NAS technology has several inherent limitations. First, NAS systems are severely impacted by their fundamental inability to scale performance and capacity. Current NAS systems only scale performance within the limits of a single NAS server with a single network connection. Thus, a single NAS server can only scale capacity to a finite number of disks attached to that NAS server. These fundamental limitations of current file storage systems create a variety of challenges. First, customers must use multiple NAS systems to meet capacity and performance requirements. The use of multiple NAS systems requires the customer to manage multiple file systems and multiple NAS system images. These attempts lead to inefficient utilization of storage assets because files must be manually distributed across multiple NAS systems to meet overall capacity and performance requirements. Invariably, this leaves pockets of unused capacity in the multiple NAS systems. Moreover, frequently accessed files, sometimes referred to as hot files, may only be served by a single NAS server, resulting in a bottleneck that impacts performance of the storage system. These issues result in substantially higher management costs to the end-user as well as high acquisition costs to purchase proprietary NAS systems.

A storage area network ("SAN") is another configuration used to store large amounts of data. In general, a SAN configuration consists of a network of disks. Clients access disks over a network. Using the SAN configuration, the client typically accesses each individual disk as a separate entity. For example, a client may store a first set of files on a first disk in a network, and store a second set of files on a second disk in the SAN system. Thus, this technique requires the clients to manage file storage across the disks on the storage area network. Accordingly, the SAN configuration is less desirable because it requires the client to specifically manage storage on each individual disk. Accordingly, it is desirable to develop a system that manages files with a single file system across multiple disks.

SUMMARY OF THE INVENTION

A distributed data storage system stores a single image file system across a plurality of physical storage volumes. One or more clients communicate with the distributed data storage system through a network. The distributed data storage system includes a plurality of storage nodes. Each storage node services requests for storage operations on the files stored on the physical storage volumes. In one embodiment, the physical storage is direct attached storage. For this embodiment, at least one physical storage volume is directly coupled to each storage node. In another embodiment, the physical storage volumes are coupled to the storage nodes through a storage area network ("SAN").

To conduct a storage operation, including read and write operations, a client transmits a request over the network for a file identified in the file system. One of the storage nodes is selected to process the request. In one embodiment, the distributed data storage system contains a load balancing switch that receives the request from the client and that selects one of the client nodes to process the storage operation. To process the request, the storage node accesses at least one of the physical volumes and transmits a response for the storage operation to the client.

DETAILED DESCRIPTION

The disclosure of U.S. Provisional Patent Application No. 60/419,778, filed Oct. 17, 2002, entitled "A Distributed Storage System", is hereby expressly incorporated herein by reference.

Figure 1:
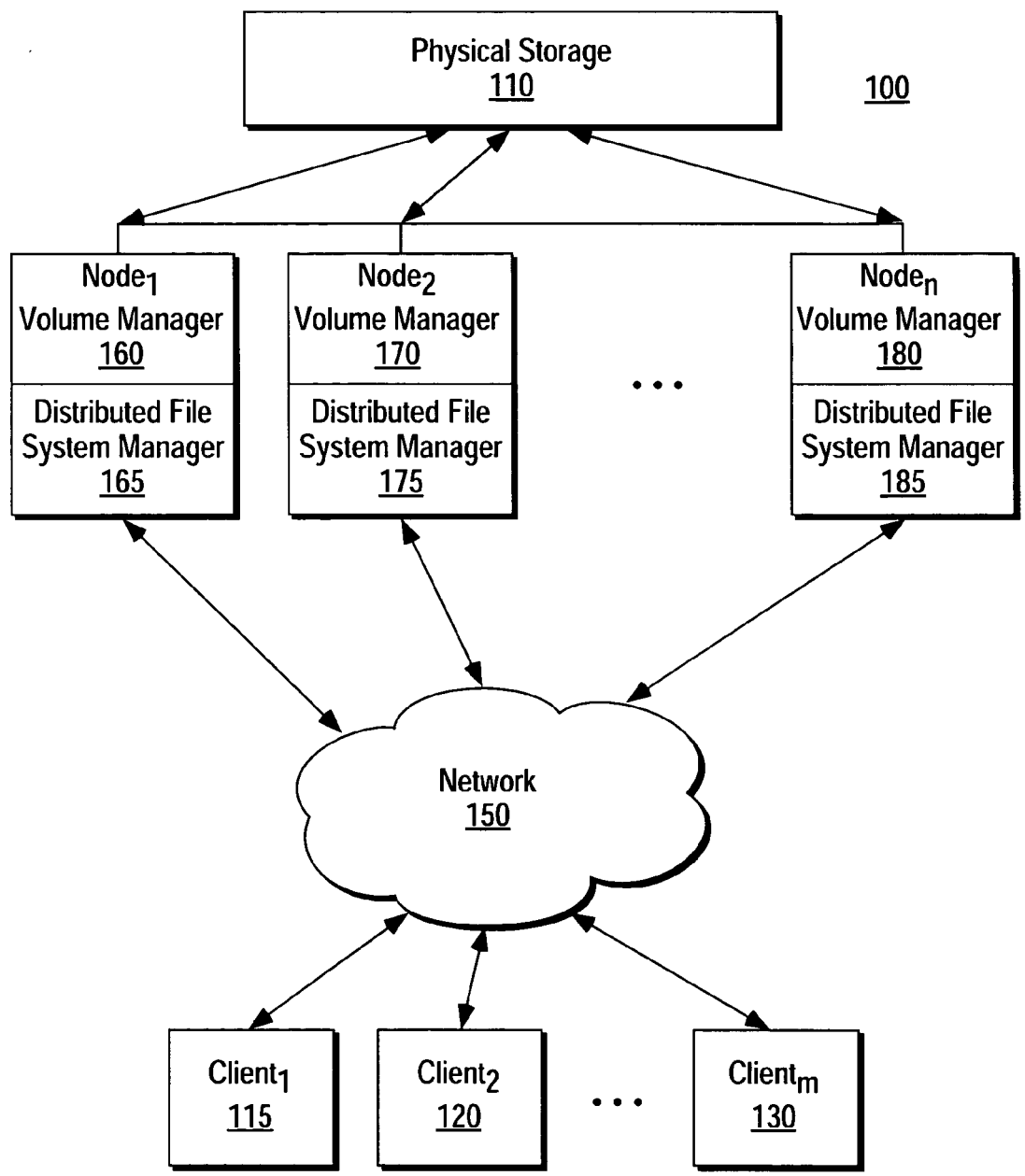
FIG. 1 is a block diagram illustrating one embodiment for the distributed network attached storage system of the present invention.

FIG. 1 is a block diagram illustrating one embodiment for the distributed network attached storage system of the present invention. As shown in FIG. 1, the system 100 includes "n" nodes (wherein n is any integer greater than or equal to two). Each node may be implemented with a conventional computer, such as a server. Also a shown in FIG. 1, the nodes are coupled to each other in order to provide a single image across each node of the system. In one embodiment, the nodes are coupled together through an Ethernet network.

The nodes (1-*n*) are coupled to a network (150). Also coupled to the network are "m" clients, where "m" is an integer value greater than or equal to one. The network may be any type of network that utilizes any well-known protocol (e.g., TCP/IP, UDP, etc.). Also, as shown in FIG. 1, the distributed NAS system 100 includes physical storage 110 accessible by the nodes. For example, physical storage 110 may comprise one or more hard disk drives, configured to support storage failure modes (i.e., RAID configuration). A client, such as clients 115, 120 and 130, access a node across network 150 to store and retrieve data on physical storage 110.

In general, the distributed NAS system of the present invention creates a single system image that scales in a modular way to hundreds of terabytes and several hundred thousand operations per second. In one embodiment, to minimize costs, the distributed NAS system software runs on industry standard hardware and operates with industry standard operating systems. The distributed NAS system allows flexible configurations based on specific reliability, capacity, and performance requirements. In addition, the distributed NAS system scales without requiring any changes to end user behavior, client software or hardware. For optimal performance, in one embodiment, the distributed NAS system distributes client load evenly so as to eliminate a central control point vulnerable to failure or performance bottlenecks. The distributed NAS system permits storage capacity and performance to scale without disturbing the operation of the system. To achieve these goals, the distributed NAS system utilizes a distributed file system as well as a volume manager. In one embodiment, each node (or server) consists of, in addition to standard hardware and operating system software, a distributed file system manager (165, 175 and 185) and a volume manager (160, 170 and 180) for nodes 1, 2 and n, respectively.

Figure 2:
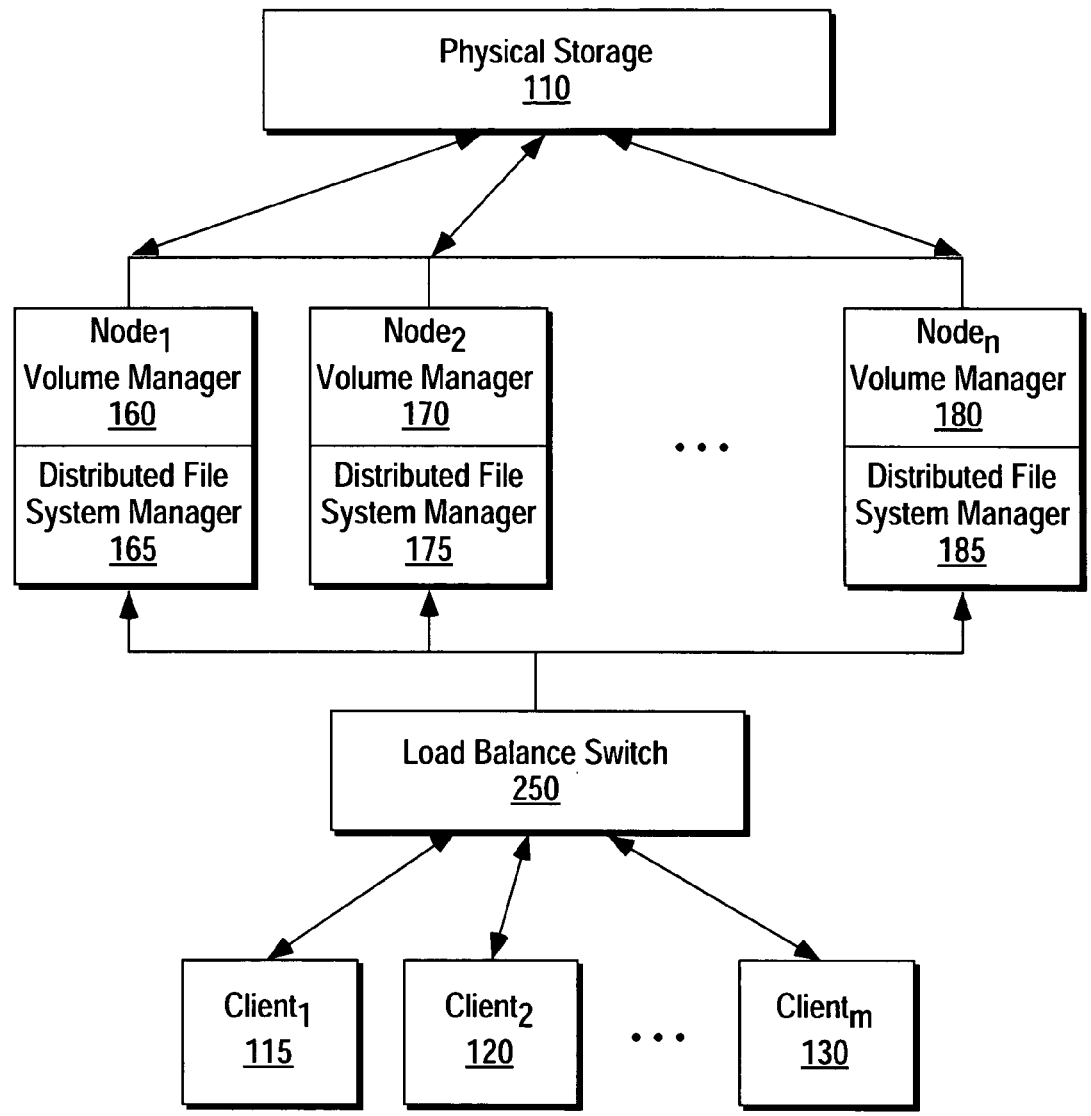
FIG. 2 is a block diagram illustrating one embodiment for assigning client requests in the distributed NAS system.

FIG. 2 is a block diagram illustrating one embodiment for assigning client requests in the distributed NAS system. For this embodiment, clients (1-n) are coupled to a load balance switch 250, accessible over a network. In one embodiment, load balance switch 250 comprises a layer four (L4) load-balancing switch. In general, L4 switches are capable of effectively prioritizing TCP and UDP traffic. In addition, L4 switches, incorporating load-balancing capabilities, distribute requests for HTTP sessions among a number of resources, such as servers. In operation, clients, executing storage operations, access load balance switch 250, and load balance switch 250 selects a node (server) to service the client storage operation.

Figure 3:
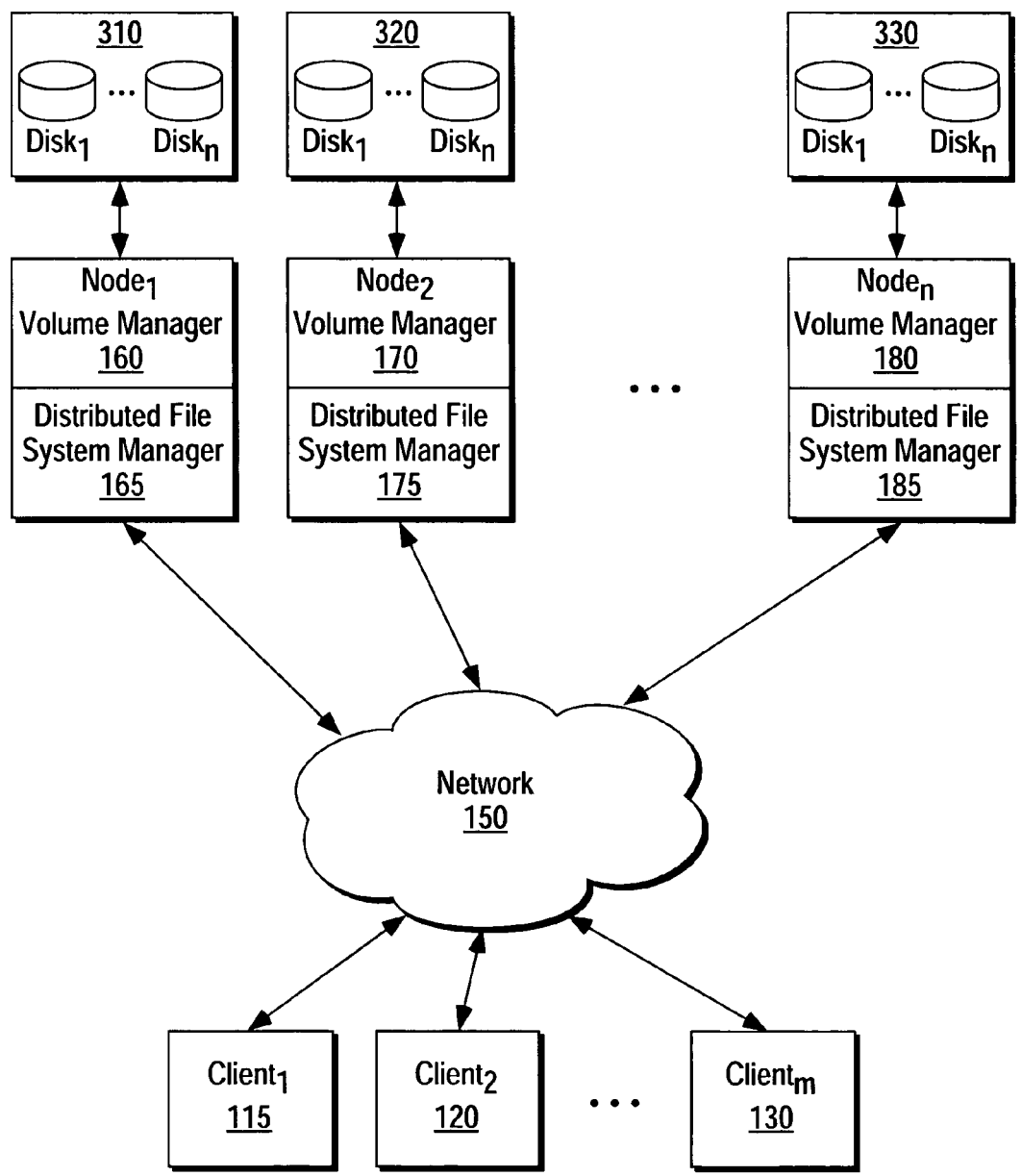
FIG. 3 is a block diagram illustrating one embodiment for a distributed NAS system incorporating direct attached disks.

The nodes of the distributed NAS system communicate with one or more hard disk drives. FIG. 3 is a block diagram illustrating one embodiment for a distributed NAS system incorporating direct attached disks. As shown in FIG. 3, each node (node$_1$, node$_2$ ... node$_n$) is coupled to "n" disks (310, 320 and 330). For this embodiment, a node directly accesses one or more disks through a standard hard disk drive interface (e.g., EIDE, SCSI, iSCSI, or fiber channel). FIG. 3 illustrates "n" disks attached to a node (server); however, although any number of disks, including a single disk, may be attached to a node without deviating from the spirit or scope of the invention.

Figure 4:
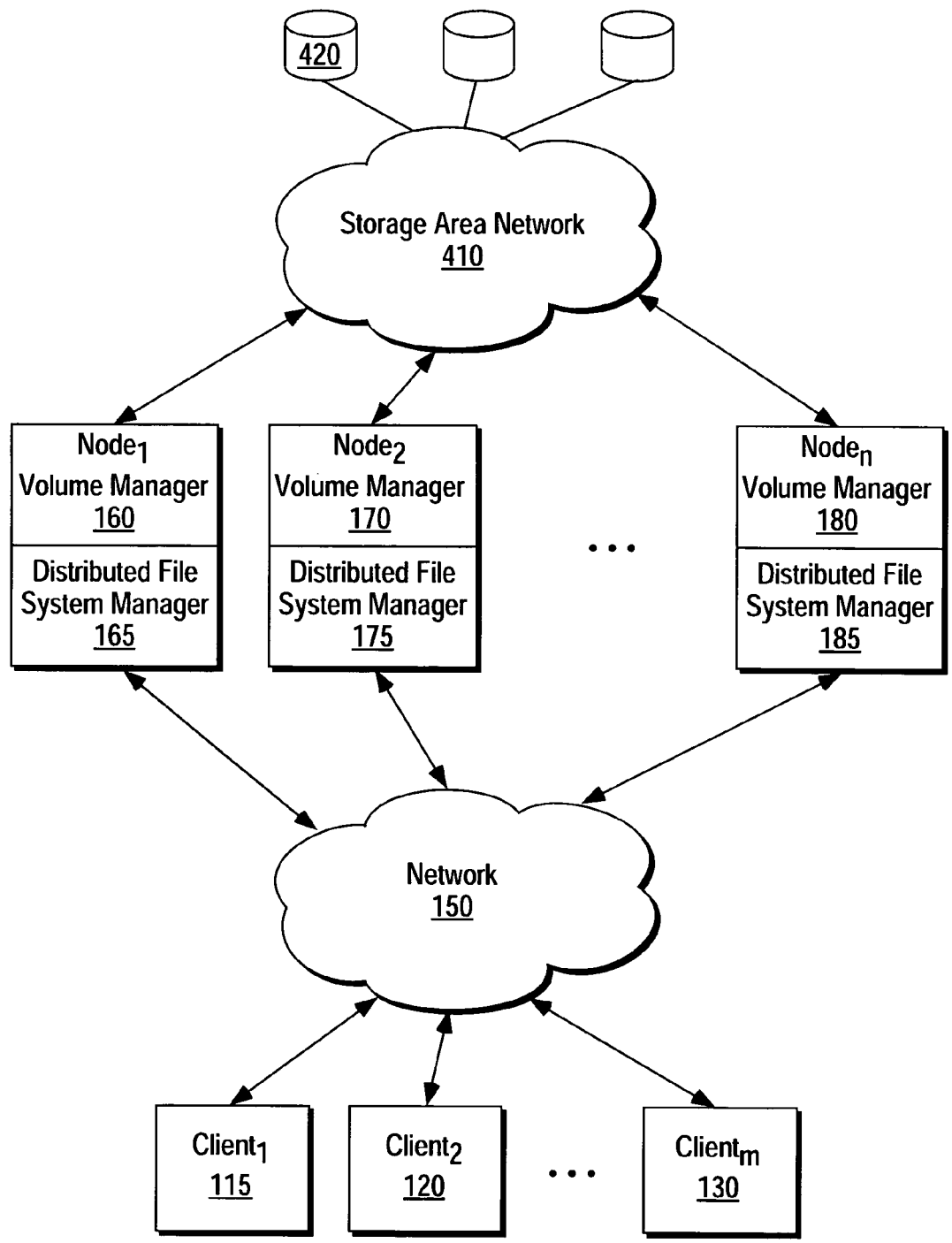
FIG. 4 is a block diagram illustrating one embodiment for using a SAN configuration for a distributed NAS system.

In another embodiment, the nodes of the distributed NAS system utilize disks coupled through a network (e.g., storage area network "SAN"). FIG. 4 is a block diagram illustrating one embodiment for using a SAN configuration for a distributed NAS system. As shown in FIG. 4, the distributed NAS nodes (servers) are coupled to a storage area network 410. The storage area network 410 couples a plurality of hard disk drives to each node (server) in the distributed NAS system. The storage area network 410 may comprise any type of network, such as Ethernet, Fibre Channel, etc. In operation, a node accesses a disk, as necessary, to conduct read and write operations. Each node (server) has access to each disk in the storage area network 410. For example, if volume manager 170 determines that data resides on disk 420, then volume manager 170 accesses disk 420 over storage area network 410 in accordance with the protocol for the storage area network 420. If storage area network 410 implements a TCP/IP protocol, then volume manager 170 generates packet requests to disk 420 using the IP address assigned to disk 420.

In general, index nodes, referred to as "inodes" uniquely identify files and directories. Inodes map files and directories of a file system to physical locations. Each inode is identified by a number. For a directory, an inode includes a list of file names and sub directories, if any, as well as a list of data blocks that constitute the file or subdirectory. The inode also contains size, position, etc. of the file or directory. When a selected node (NAS server) receives a request from the client to service a particular inode, the selected node performs a lookup to obtain the physical location of the corresponding file or directory in the physical media.

Figure 5:
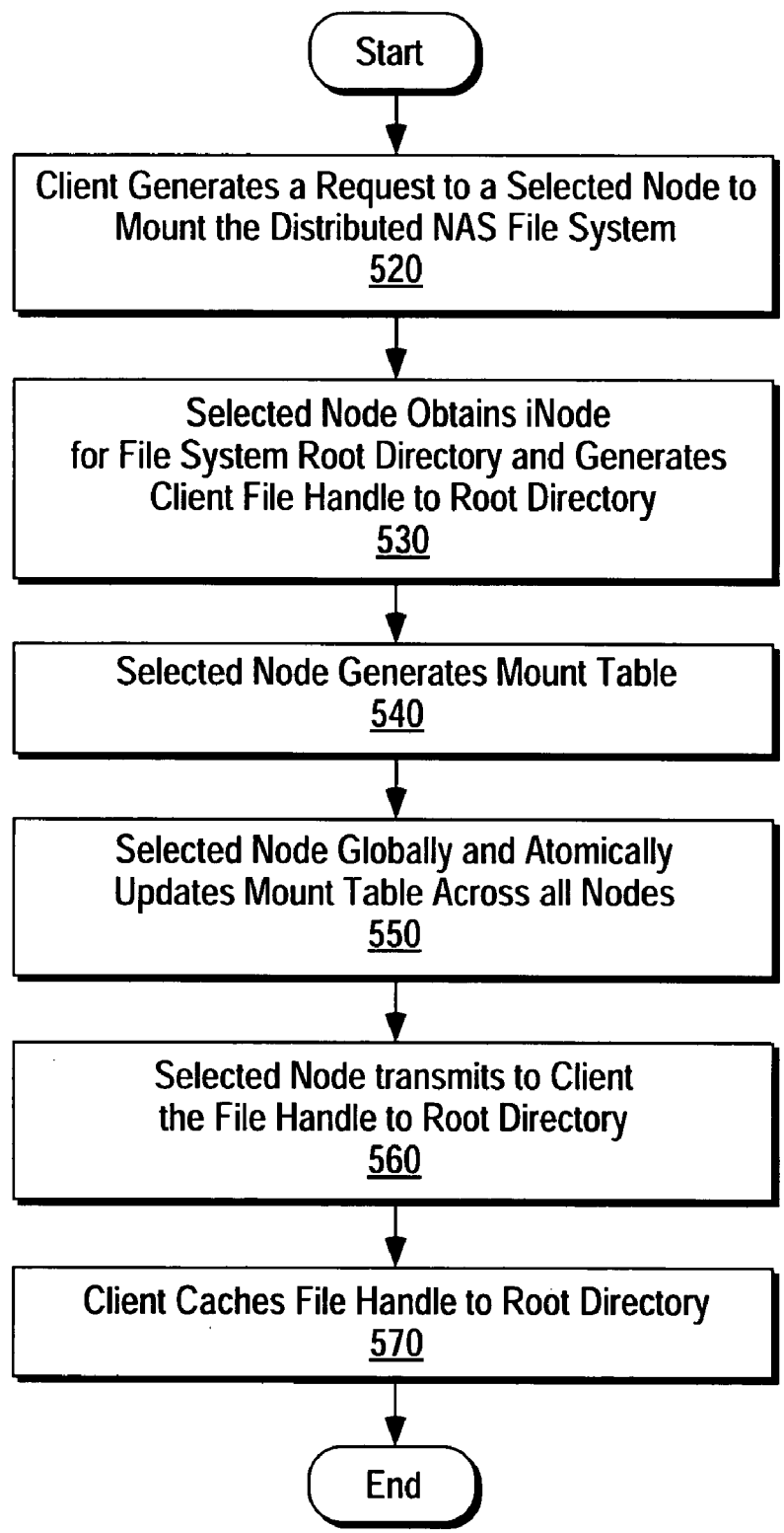
FIG. 5 is a flow diagram illustrating one embodiment for initializing a client computer in the distributed NAS system.

As an initial procedure, a client of the distributed NAS system mounts the distributed file system. FIG. 5 is a flow diagram illustrating one embodiment for initializing a client computer in the distributed NAS system. Through the client distributed NAS software, the client generates a request to a selected node to mount the NAS file system (block 520, FIG. 5). As used herein, the term "selected node" connotes the node servicing the client request. As described above, in one embodiment, the node is selected by a load balance switch (i.e., the client generates a network request to the load balance switch, and the load balance switch selects, based on a load balancing criteria, a server to service the request).

The selected node (file system manager) obtains the inode for the file system root directory, and generates a client file handle to the root directory (block 530, FIG. 5). The selected node determines the inode of the root directory using a "superblock." The superblock is located at a known address on each disk. Each disk uses a superblock to point to a location on one of the disks that stores the inode for the root directory of the file system. Once the root inode is located, the file system manager finds a list of files and directories contained within the root directory.

The file handle, a client side term, is a unique identifier the client uses to access a file or directory in the distributed file system. In one embodiment, the distributed file system translates the file handle into an inode. In addition, a file handle may include the time and date information for the file/directory. However, any type of file handle may be used as long as the file handle uniquely identifies the file or directory.

The selected node (the node processing the client requests) generates a mount table (block 540, FIG. 5). In general, the mount table tracks information about the client (e.g., client address, mounted file systems, etc.). The mount table, a data structure, is replicated in each node of the distributed NAS system, and is globally and atomically updated (block 550, FIG. 5). The selected node transmits to the client a file handle to the root directory (block 560, FIG. 5). The client caches the file handle for the root directory (block 570, FIG. 5).

In one embodiment, the file system for the distributed NAS is a high-performance distributed file system. The file system fully distributes both namespace and data across a set of nodes and exports a single system image for clients, applications and administrators. As a multi-node system, the file system acts as a highly scalable, high-performance file server with no single point of failure. As a storage medium, the file system utilizes a single shared disk array. It harnesses the power of multiple disk arrays connected either via a storage area network or directly to network servers. The file system is implemented entirely in user space, resulting in a lightweight and portable file system. In one embodiment, the file system provides 64-bit support to allow very large file system sizes.

The volume manager (160, 170 and 180, FIG. 1) controls and virtualizes logical storage volumes, either directly attached to a node, through EIDE, SCSI, iSCSI, fiber channel, or indirectly attached through another server on the LAN. The volume manager offers administrators access to advanced management features. It provides the ability to extend logical volumes across nodes. This results in unprecedented flexible, reliable, high-performance storage management in a multi-node network environment.

The volume manager consists of three parts: logical volumes, volume groups, and physical volumes. Each layer has particular properties that contribute to the capabilities of the system. The distributed volume group is the core component of the system. A volume group is a virtualized collection of physical volumes. In its simplest form, a distributed volume group may be analogized to a special data container with reliability properties. A volume group has an associated level of reliability (e.g., RAID level). For example, a distributed volume group may have similar reliability characteristics to traditional RAID 0,1 or 5 disk arrays. Distributed volume groups are made up of any number, type or size of physical volumes.

A logical volume is a logical partition of a volume group. The file systems are placed in distributed logical volumes. A logical extent is a logically contiguous piece of storage within a logical volume. A physical volume is any block device, either hardware or software, exposed to the operating system. A physical extent is a contiguous piece of storage within a physical storage device. A sector, typically 512 bytes, defines the smallest unit of physical storage on a storage device.

A physical volume is a resource that appears to the operating system as a block based storage device (e.g., a RAID device, the disk through fiber channel, or a software RAID device). A volume, either logical or physical, consists of units of space referred to as "extents." Extents are the smallest units of contiguous storage exposed to the distributed volume manager.

The volume manager allows unprecedented flexibility and scalability in storage management, to enhance the reliability of large-scale storage systems. In one embodiment, the distributed volume manager implements standard RAID 0, 1 and 5 configurations on distributed volume groups. When created, each distributed volume group is given the reliability settings that includes stripe size and raid-set size. Stripe size, sometimes referred to as a chunk or block, is the smallest granularity of data written to an individual physical volume. Stripe sizes of 8 k, 16 k and 24 k are common. RAID-set size refers to the number of stripes between parity calculations. This is typically equal to the number of physical volumes in a volume group.

As discussed above, inodes consist of pointers to physical blocks that store the underlying data. In one embodiment, inodes are stored on disk in "ifiles." For directories, inode files contain a list of inodes for all files and directories contained in that directory. In one embodiment, the distributed NAS system utilizes a map manager. In general, a map manager stores information to provide an association between inodes and distributed NAS nodes (servers) managing the file or directory. The map manager, a data structure, is globally stored (i.e., stored on each node) and is atomically updated. Table 1 is an example map manager used in the distributed NAS system.

TABLE 1

| Inode Range | Node |
|---|---|
| 0-100 | A |
| 101-200 | B |
| 201-300 | C |

For this example, the distributed NAS system contains three nodes (A, B and C). Inodes within the range from 0 to 100 are managed by $node_A$. Inodes, lying within the range of 101 to 200, are managed by $node_B$, and inodes, falling within the range of 201-300, are managed by $node_C$.

Figure 6:
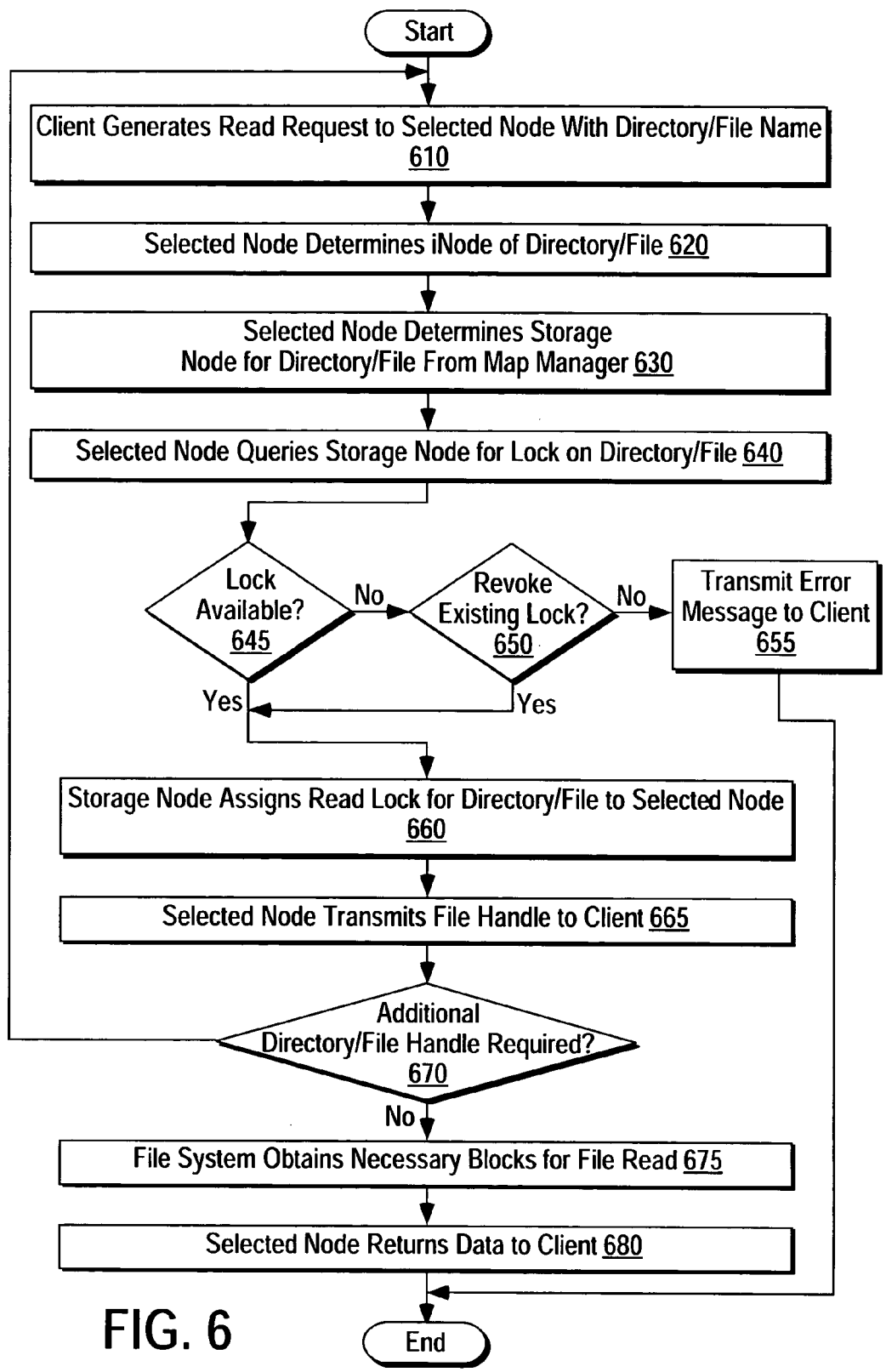
FIG. 6 is a flow diagram illustrating one embodiment for conducting a read operation in the distributed NAS system.

FIG. 6 is a flow diagram illustrating one embodiment for conducting a read operation in the distributed NAS system. To conduct a read operation, a client generates a read request to the distributed NAS system with a directory/file name (block 610, FIG. 6). The distributed NAS system selects a node to process the request (i.e., selected node). For example, the load-balancing switch may select $node_C$ to process the read operation. Also, for this example, a client may generate a request to read the file "/export/temp/foo.txt." For this example, the client must obtain a file handle for "/export/temp/foo.txt." To accomplish this, the client starts with the root file handle (i.e., the root file handle was obtained when the client mounted the distributed file system).

If the client has cached the file handle for "/export", then the client first requests a file handle for "/export/temp." In response to the client request, the selected node (server) determines the inode for the directory/file (block 620, FIG. 6). For the above example, the selected node determines the inode for the directory "/export/temp." Specifically, the selected node looks-up, in the list of inodes for the "/export" directory, the inode for the directory "/temp." For purposes of explanation, the associated inode for the directory "/temp" is 55.

With the inode, the selected node determines, from the map manager, the storage node from the directory/file (block 630, FIG. 6). For the above example and the map manager shown in Table 1, inode 55 is managed by $node_A$. The selected node queries the storage node (the node managing the directory/file) for a lock on the directory/file (block 640, FIG. 6). In the example set forth above, $node_C$, the selected node, queries $node_A$, the storage node, to obtain a lock for the directory "/export/temp." A lock may be an exclusive or shared lock, including both read and write types. If a lock is available for the file/directory, then the storage node assigns a read lock for the directory/file to the selected node (blocks 645 and 660, FIG. 6). If a lock is not available, then the storage node attempts to revoke the existing lock(s) (blocks 645 and 650, FIG. 6). If the storage node can revoke the existing lock(s), then the storage node assigns a read lock to the selected node for the directory/file (blocks 650 and 660, FIG. 6). If the storage node cannot revoke existing lock(s), then an error message is transmitted to the client that the file/directory is not currently available for reading (blocks 650 and 655, FIG. 6).

After obtaining the appropriate lock, the selected node transmits a file handle to the client (block 665, FIG. 6). For the above example, the selected node, $node_C$, transmits a file handle for the directory "/export/temp." The client caches the file handle. If additional directory/file handles are required to read the file, the process to obtain additional directory/file handles is performed (block 670, FIG. 6). For the above example, the client generates a read request for "expert/temp/foo.txt." Thereafter, the selected node determines the inode for the file "/export/temp/foo.txt." For this example, the file system manager looks-up inode 55, and identifies the file, foo.txt, as being located in the "/temp directory." The file system manager extracts the inode associated with the file, foo.txt (e.g., inode=136). The map manager identifies node$_B$ as the owner of inode 136. Thus, node$_C$, the selected node, communicates with node$_B$, the storage node, to obtain a lock for the file, foo.txt. Node$_C$ then returns the file handle of foo.txt to the client.

In response to the read request, the file system manager obtains the necessary blocks, from the volume manager, to read the file (block 675, FIG. 6). The file system manager, using inode 136, looks-up in the file inode, and identifies the physical blocks associated with inode 136. For the above example, if the client requested to read the first 1024 bytes of the file, then the file system manager issues the command, (read blocks 130 and 131, buffer) to read the first two blocks of the file (e.g., the first two blocks of the file "/export/temp/foo.txt" are numbered 130 and 131). In response, the volume manager places the first 1024 bytes of the file "/export/temp/foo.txt" in a buffer. The selected node returns the data from the buffer to the client (block 680, FIG. 6).

Figure 7:
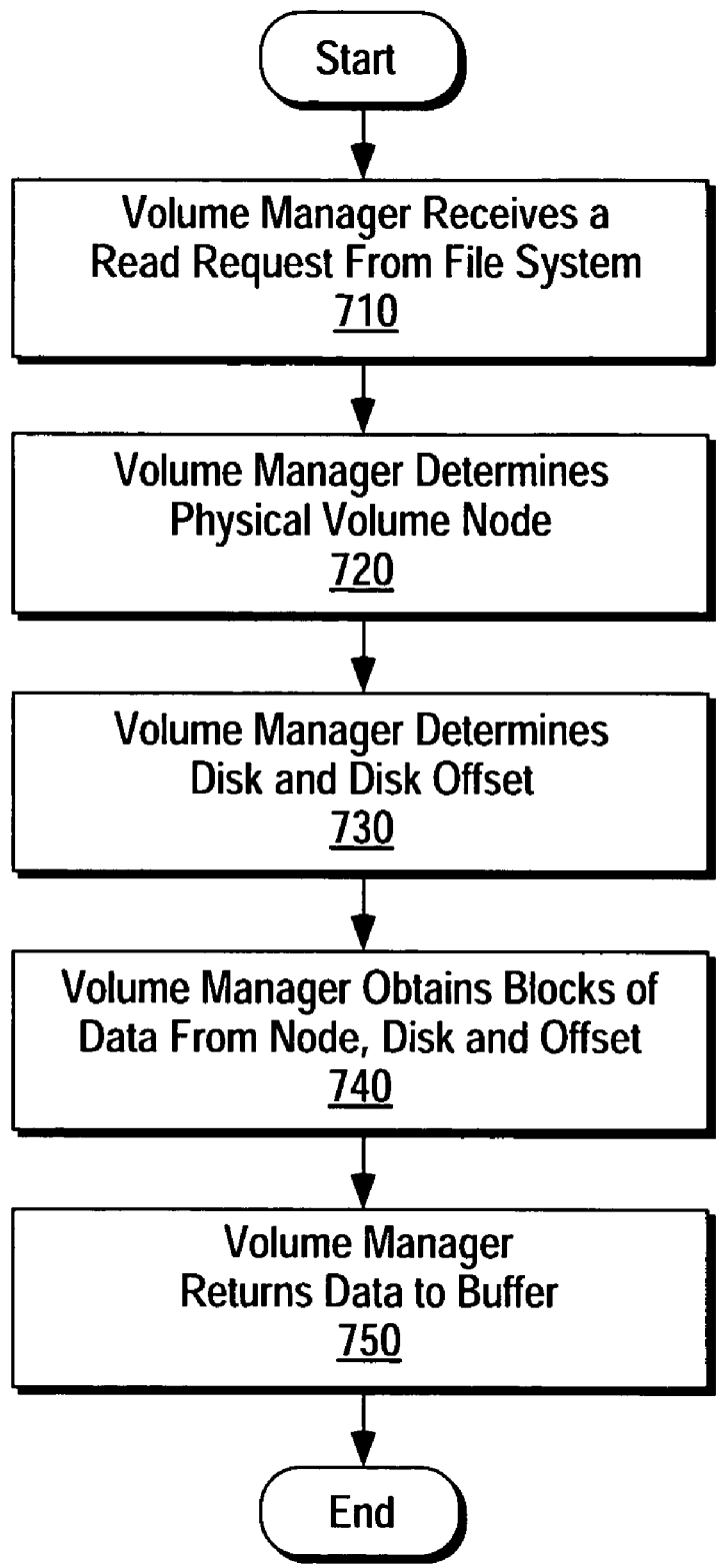
FIG. 7 is a flow diagram illustrating one embodiment for processing read operations in the volume manager.

In general, the volume manager responds to requests from the distributed file system manager. FIG. 7 is a flow diagram illustrating one embodiment for processing read operations in the volume manager. To initiate the process, the volume manager receives the request from the file system manager (block 710, FIG. 7). A volume is spread across nodes. Each disk (e.g., 0-256 sectors) requires a mapping to translate virtual sectors to physical sectors. The volume manager determines the physical volume node for the subject of the read operation (block 720, FIG. 7). The volume manager communicates with the physical volumes. To conduct a read operation, the file system manager requests the volume manager to read/write a block or a group of sectors (e.g., sectors 24-64, etc.).

The volume manager determines the disk and disk offset (block 730, FIG. 7). The volume manager algebraically determines the location of the logical sectors on the physical volumes. Table 2 illustrates an example mapping from disks to nodes for an example distributed NAS system.

TABLE 2

| Sector | Physical Disk | Node |
|---|---|---|
| 0-256 | 1 | A |
| 257-512 | 2 | B |
| 513-768 | 3 | C |
| 767-1024 | 4 | C |

For this embodiment, the volume manager calculates the node in accordance with the arrangement illustrated in Table 2. The disks are apportioned by sectors, and the offset measures the number of sectors within a disk. The volume manager obtains blocks of data from the node, disk on the node and the offset within the disk (block 740, FIG. 7). The volume manager then returns data to the buffer (file system manager) (block 750, FIG. 7).

Figure 8:
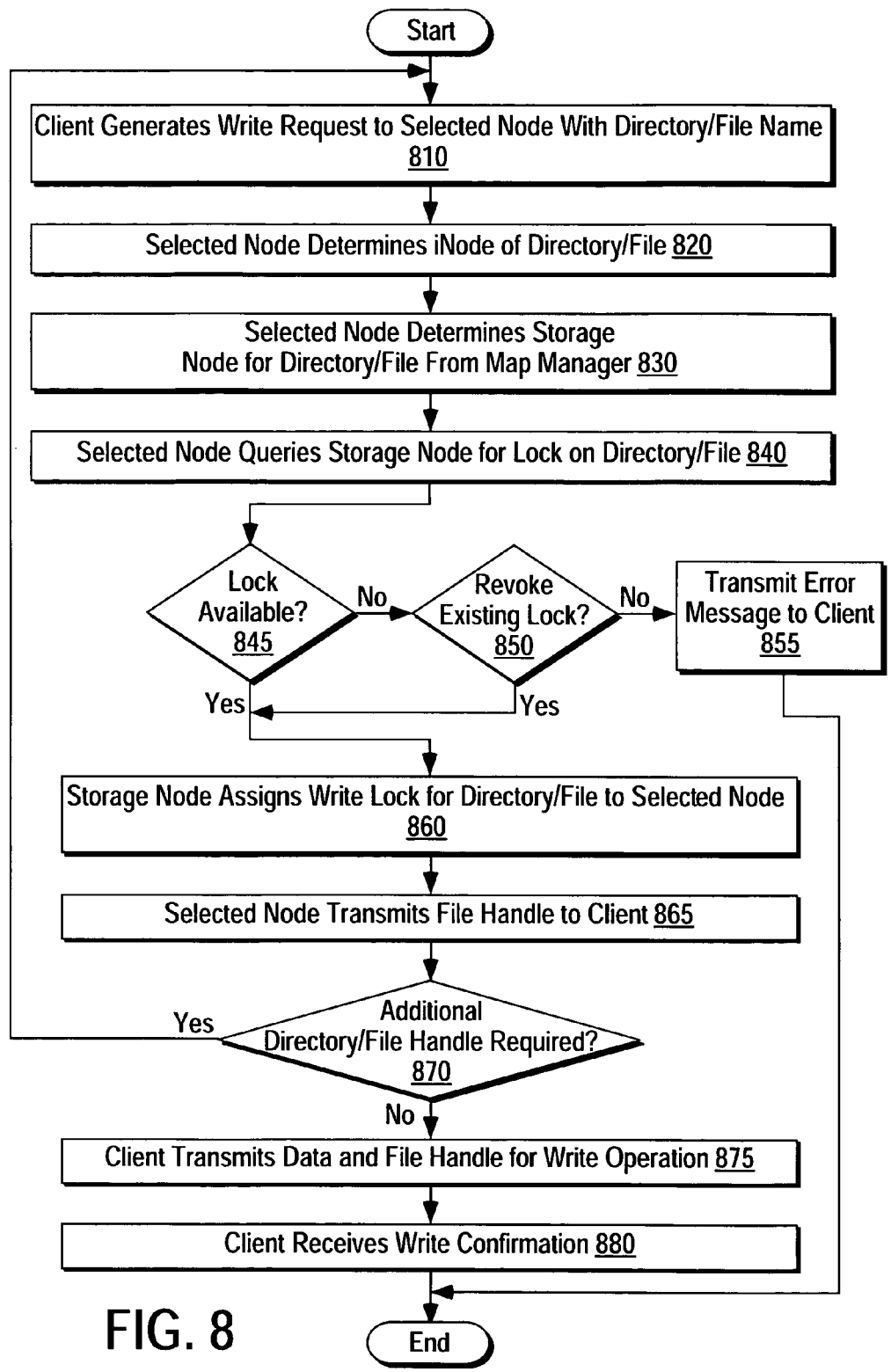
FIG. 8 is a flow diagram illustrating one embodiment for conducting a write operation in the distributed NAS system.

FIG. 8 is a flow diagram illustrating one embodiment for conducting a write operation in the distributed NAS system. First, a client generates a write request to the distributed NAS system with a directory/file name (block 810, FIG. 8). The distributed NAS system selects a node to process the request (e.g., node$_C$). Using the above example, a client may generate a request to write to the file "/export/temp/foo.txt." For this example, the client must obtain a file handle for "/export/temp/foo.txt." As described above, the client starts with the root file handle. If the client has cached the file handle for "/export", then the client first requests a file handle for "/export/temp." In response to the client request, the selected node (server) determines the inode for the directory/file (block 820, FIG. 8). For the above example, the selected node determines the inode for the directory "/export/temp.", inode 55.

The selected node determines, from the map manager, the storage node from the directory/file for the associated inode (block 830, FIG. 8). For the above example (Table 1), inode 55 is managed by node$_A$. The selected node queries the storage node (the node managing the directory/file) for a lock on the directory/file (block 840, FIG. 8). Thus, node$_C$, the selected node, queries node$_A$, the storage node, to obtain a write lock for the directory "/export/temp." If a write lock is available for the file/directory, then the storage node assigns the write lock for the directory/file to the selected node (blocks 845 and 860, FIG. 8). If a lock is not available, then the storage node attempts to revoke the existing lock(s) (blocks 845 and 850, FIG. 8). If the storage node can revoke the existing lock(s), then the storage node assigns the write lock to the selected node for the directory/file (blocks 850 and 860, FIG. 8). If the storage node cannot revoke existing lock(s), then an error message is transmitted to the client that the file/directory is not currently available for writing (blocks 850 and 855, FIG. 8).

After obtaining the appropriate lock, the selected node transmits a file handle to the client (block 865, FIG. 8). For the above example, the selected node, node$_C$, transmits a file handle for the directory "/export/temp." The client caches the file handle. If additional directory/file handles are required to read the file, the process to obtain additional directory/file handles are performed (block 870, FIG. 8). For the above example, the client generates a read request for "expert/temp/foo.txt." As discussed above, the selected node determines the inode for the file "/export/temp/foo.txt", (e.g., inode=136). The map manager identifies node$_B$ as the owner of inode 136. A lock for the file, foo.txt, is obtained. Node$_C$ then returns the file handle of foo.txt to the client.

The client transmits data, for the write operation, and the file handle (block 875, FIG. 8). The file system manager, and the volume manager execute the write operation (See FIG. 9). The client receives a written confirmation from the file system manager (block 880, FIG. 8).

Figure 9:
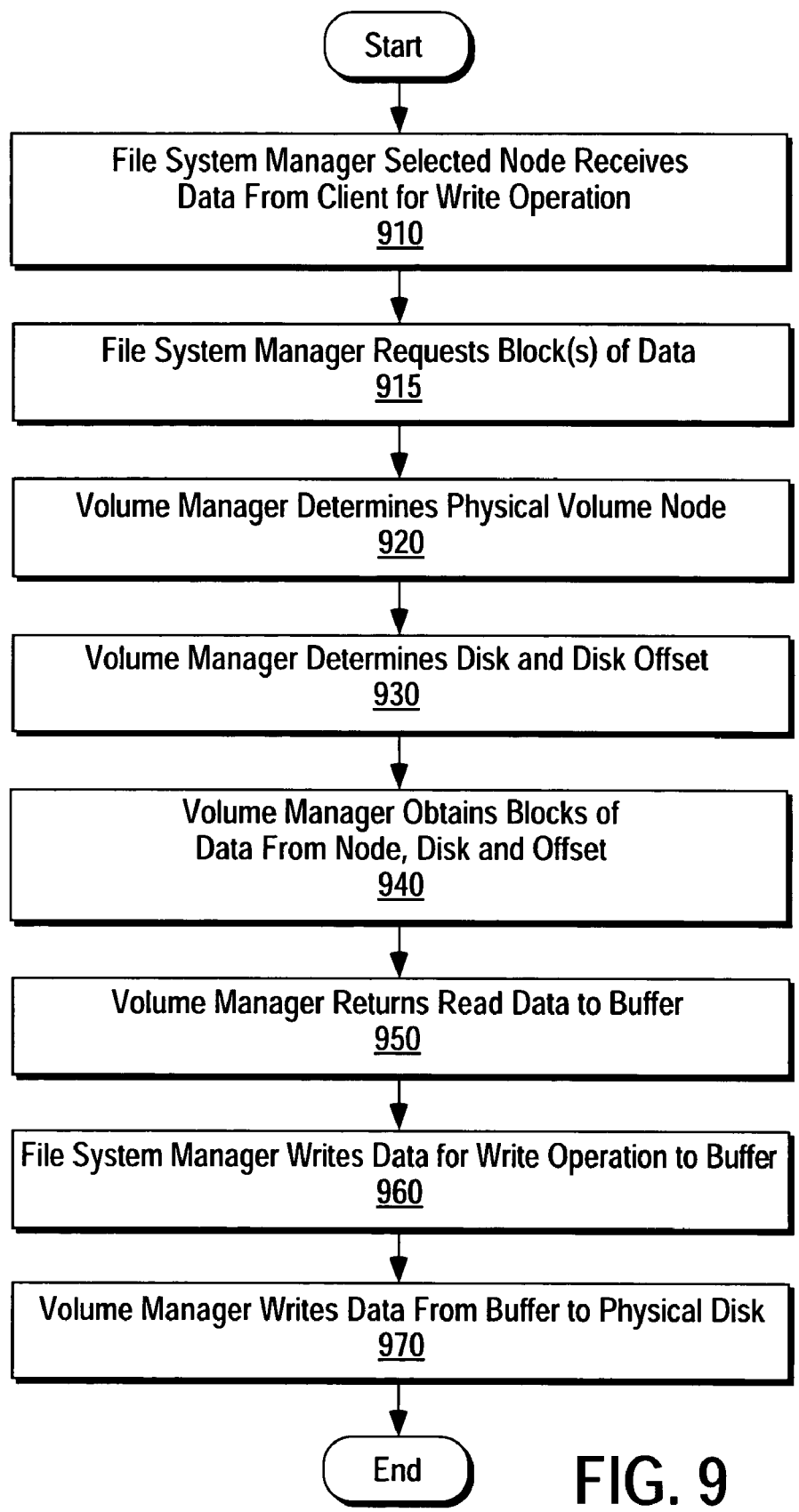
FIG. 9 is a block diagram illustrating one embodiment for performing a write operation in the volume manager.

FIG. 9 is a block diagram illustrating one embodiment for performing a write operation in the volume manager. The file manager on the selected node receives data from the client for the write operation (block 910, FIG. 9). In response, the file system manager requests blocks of data from the volume manager (block 915, FIG. 9). The volume manager determines the physical volume node for the write operation (block 920, FIG. 9). The volume manager determines the disk and disk offset (block 930, FIG. 9). The volume manager then obtains blocks of data from the node, disk and offset (block 940, FIG. 9). The volume manager returns read data to a buffer (block 950, FIG. 9). The file system manager writes data for the write operation to the buffer (block 960, FIG. 9). Thereafter, volume manager writes data from the buffer to the physical disk (block 970, FIG. 9).

Although the present invention has been described in terms of specific exemplary embodiments, it will be appreciated that various modifications and alterations might be made by those skilled in the art without departing from the spirit and scope of the invention.

What is claimed is:

1. A distributed data storage system comprising:
    a plurality of physical storage volumes for storing a plurality of files of data accessible by a single file system;
    a network; and
    a plurality of storage nodes, coupled to said network, each one of said storage nodes having access to each of said files stored on said physical storage volumes, the files of data being distributed across the plurality of physical storage volumes to provide a single system image to the plurality of storage nodes, each file associated with one of the plurality of storage nodes and wherein each of said storage nodes for receiving a request from a client for a storage operation on a file identified in said single system image, said file managed by another storage node, upon receiving said request by a receiving storage node, the receiving storage node communicating with said other storage node to obtain a lock for said file from said other storage node, upon receiving said lock, said receiving storage node processing said storage operation by accessing at least one of said physical storage volumes, and transmitting a response for said storage operation to said client;

a storage node comprising:
  a distributed file system manager for processing said client requests for storage operations; and
  a volume manager to read data from and/or to write data to said physical volumes;

the distributed data storage system also comprising a layer-4 load balancing switch, coupled to said network, for receiving said request from a client for a storage operation and for selecting one of said storage nodes to process said storage operation, the layer-4 load balancing switch being to prioritize transport layer protocol traffic and distribute application protocol layer sessions, the one of the storage nodes to obtain an inode for a root directory and to transmit to the client a file handle to the root directory, the file handle to be used by the client to access the file identified in said single system image, each of the storage nodes to store a map manager data structure, the map manager data structure including a table correlating respective ranges of inodes in the distributed data storage system with respective nodes in the distributed data storage system that manage the respective ranges.

2. The distributed storage system as set forth in claim 1, wherein at least one of said physical storage volumes is directly coupled to each of said storage nodes.

3. The distributed storage system as set forth in claim 1, wherein said physical storage volumes are coupled through a network accessible by said storage nodes.

4. The distributed storage system as set forth in claim 1, wherein a distributed file system manager of a first storage node is to communicate with a volume manger of a second storage node to access a file stored on a physical volume attached to said second storage node.

5. The distributed storage system as set forth in claim 1, wherein said storage operation comprises a write operation.

6. The distributed storage system as set forth in claim 1, wherein said storage operation comprises a read operation.

7. A method for storing files in a distributed storage system, said method comprising:
  storing a plurality of files, in a plurality of physical storage volumes;
  coupling a plurality of storage nodes to said physical storage volumes through said network, the plurality of files being distributed across the plurality of physical storage volumes to provide a single system image to the plurality of storage nodes;
  providing access to each one of said storage nodes to each of said physical storage volumes, each file associated with one of the plurality of storage nodes;
  receiving, at each of said storage nodes, a request from a client for a storage operation on a file identified in said single system image, said file managed by another storage node;
  upon receiving said request by a receiving storage node, the receiving storage node communicating with said other storage node to obtain a lock for said file from said other storage node;
  upon receiving said lock, said receiving storage node accessing at least one of said physical volumes; and
  transmitting a response to said storage operation to said client by said receiving storage node;

the receiving, at each of said storage nodes, a request from a client for a storage operation comprising:
  receiving a request at a distributed file system manager; and
  processing said client request for said storage operation;
  accessing at least one of said physical volumes in response to said storage operation comprises reading data from and/or writing data to said physical volumes from a volume manager;

the method further comprising:
  coupling a layer-4 load balancing switch to said network;
  receiving said request from a client for a storage operation; and
  selecting one of said storage nodes to process said storage operation, the layer-4 load balancing switch being to prioritize transport layer protocol traffic and distribute application layer protocol sessions, the one of the storage nodes to obtain an inode for a root directory and to transmit to the client for the storage operation a file handle to the root directory, the file handle to be used by the client for the storage operation to access the file identified in said single system image, each of the storage nodes to store a map manager data structure, the map manager data structure including a table correlating respective ranges of inodes in the distributed data storage system with respective nodes in the distributed data storage system that manage the respective ranges.

8. The method as set forth in claim 7, further comprising coupling at least one of said physical storage volumes to each of said storage nodes.

9. The method as set forth in claim 7, further comprising accessing said physical storage volumes through a network.

10. The method as set forth in claim 7, further comprising:
  communicating between a distributed file system manager of a first storage node and a volume manger of a second storage node to access a file stored on a physical volume attached to said second storage node.

11. The method as set forth in claim 7, wherein said storage operation comprises a write operation.

12. The method as set forth in claim 7, wherein said storage operation comprises a read operation.

13. A computer readable medium for storing a plurality of instructions, which when executed by a computer system, causes the computer system to perform:
  storing a plurality of files, in a plurality of physical storage volumes;
  coupling a plurality of storage nodes to said physical storage volumes through said network, the plurality of files being distributed across the plurality of physical storage volumes to provide a single system image to the plurality of storage nodes;
  providing access to each one of said storage nodes to each of said physical storage volumes, each file associated with one of the plurality of storage nodes;

receiving, at each of said storage nodes, a request from a client for a storage operation on a file identified in said single system image, said file managed by another storage node;

upon receiving said request by a receiving storage node, the receiving storage node communicating with said other storage node to obtain a lock for said file from said other storage node;

upon receiving said lock, said receiving storage node accessing at least one of said physical volumes in response to said storage operation to read data from and/or write data to said physical storage volumes; and transmitting a response to said storage operation to said client by said receiving storage node;

the receiving, at each of said storage nodes, a request from a client for a storage operation comprising:
  receiving a request at a distributed file system manager;
  processing said client request for said storage operation; and
  accessing at least one of said physical volumes in response to said storage operation comprises accessing said physical volumes from a volume manager;

the instructions when executed also causing the computer system to perform:
  coupling a layer-4 load balancing switch to said network;
  receiving said request from a client for a storage operation; and
  selecting one of said storage nodes to process said storage operation, the layer-4 load balancing switch being to prioritize transport layer protocol traffic and distribute application layer protocol sessions, the one of the storage nodes to obtain an inode for a root directory and to transmit to the client for the storage operation a file handle to the root directory, the file handle to be used by the client for the storage operation to access the file identified in said single system image, each of the storage nodes to store a map manager data structure, the map manager data structure including a table correlating respective ranges of inodes in the distributed data storage system with respective nodes in the distributed data storage system that manage the respective ranges.

14. The computer readable medium as set forth in claim 13, wherein the instructions when executed also cause the computer system to perform coupling at least one of said physical storage volumes to each of said storage nodes.

15. The computer readable medium as set forth in claim 13, wherein the instructions when executed also cause the computer system to perform accessing said physical storage volumes through a network.

16. The computer readable medium as set forth in claim 13, wherein the instructions when executed also cause the computer system to perform:
  communication between a distributed file system manager of a first storage node and a volume manger of a second storage node to access a file stored on a physical volume attached to said second storage node.

17. The computer readable medium as set forth in claim 13, wherein said storage operation comprises a write operation.

18. The computer readable medium as set forth in claim 13, wherein said storage operation comprises a read operation.

* * * * *